Feb. 23, 1937.  C. ADLER  2,071,321
DEVICE FOR TWISTING AND SHAPING PRETZELS
Filed July 3, 1933   5 Sheets-Sheet 1

Feb. 23, 1937.  C. ADLER  2,071,321
DEVICE FOR TWISTING AND SHAPING PRETZELS
Filed July 3, 1933   5 Sheets-Sheet 2

Fig. 3

INVENTOR.
Charles Adler
BY James N. Ramsey
ATTORNEY

Feb. 23, 1937.   C. ADLER   2,071,321
DEVICE FOR TWISTING AND SHAPING PRETZELS
Filed July 3, 1933   5 Sheets-Sheet 3

INVENTOR.
Charles Adler
BY James N. Ramsey
ATTORNEY.

Feb. 23, 1937.  C. ADLER  2,071,321
DEVICE FOR TWISTING AND SHAPING PRETZELS
Filed July 3, 1933  5 Sheets-Sheet 4

INVENTOR.
Charles Adler
BY James N. Ramsey
ATTORNEY.

Patented Feb. 23, 1937

2,071,321

UNITED STATES PATENT OFFICE 2,071,321

DEVICE FOR TWISTING AND SHAPING PRETZELS

Charles Adler, Cincinnati, Ohio

Application July 3, 1933, Serial No. 678,766

27 Claims. (Cl. 107—8)

My invention relates to means for shaping a strip of dough preferably of circular cross-section (commonly known in the pretzel industry as a "noodle") into a pretzel, placing therein a twist and properly positioning the ends of said noodle on the opposite sides of the pretzel. By such method, a pretzel, heretofore made entirely by hand, will be mechanically produced, thereby materially increasing production and greatly lowering the cost of same as well as producing the pretzels in a cleaner and more sanitary manner and causing them to be of uniform size and shape.

Figure 13:
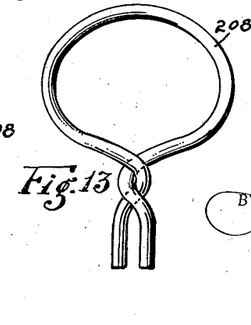
Fig. 13 shows another step in the process.
Figure 14:
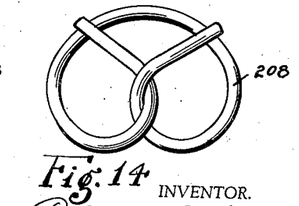
Fig. 14 shows the completed pretzel.

In the hand twisting of pretzels, the operator grabs an end of the noodle in each hand and holds the ends in a vertical position. This forms a U shape. By a slight motion, the hanging part of the noodle swings around until a twist is formed about half way up, as shown in Fig. 13. The operator then allows the circle and twist to lie on a board and immediately brings down the two loose ends, placing them in their respective positions upon the circular portion of the pretzel, as shown in Fig. 14, thereby completing a pretzel somewhat similar in shape to the figure eight, such as is commonly found on the market today. This method causes an uneven stretch of the dough at different points in the noodle, resulting in variation in thickness, so that after being baked, the thin parts, being baked more thoroughly, are much darker in color and at times even burned. In addition, these thin spots are highly brittle and with the easiest of handling breakage often results. This increases the cost of production frequently causing a loss of considerable proportion to the manufacturer. By the use of my invention, the noodle is at no time subject to strain, breakage due to the human element is eliminated and pretzels, uniform in size and shape, will be more evenly baked, and without the danger of burning parts thereof.

At the present time it is necessary for an operator engaged in the process of twisting these noodles into pretzels to come into close proximity to the ovens wherein the pretzels are baked, resulting in great discomfort to said operator. This slows production and causes considerable waste. The use of my machine will eliminate the necessity for any human element outside of observing the operation from time to time. In addition, the labor required at the present time to perform this work is skilled, difficult to instruct and difficult to manage. The use of multiple units of this machine in a given space will permit of much more rapid and uniform manufacture of pretzels.

At the present time the demand for pretzels greatly exceeds the supply and the use of this apparatus will permit their production on a 24-hour basis if necessary. Labor restrictions limit the number of hours that an operator may work, with the result that production is greatly curtailed. The oven heat existing in a plant of this type is such as to make working conditions very difficult and the operation of this machine will in this manner contribute greatly to more comfortable working conditions.

According to present practice it is necessary each day to consume from two to three hours in preheating the oven to the required temperature for baking the pretzels, thereby involving the expense of an employee during that time and also involving a waste of two or three hours time during which time the oven is not baking. Furthermore, with the use of my invention the pretzels being produced automatically by machinery permits of a continuous 24-hour operation each day without any intermission or interruption either to the pretzel forming machine or to the baking operation in the oven, so that full capacity of the plant is obtainable with the least possible expense.

My invention consists of six principal parts; namely, a table, a form, a twister, a spreader, a flipper and means for shaping the noodle to the desired form.

My invention also consists in the construction, combination, location and arrangement of parts and in the process, as herein set forth and claimed.

In the drawings which serve to illustrate a preferred embodiment of my invention

Figures 1, 2, 9, 10:
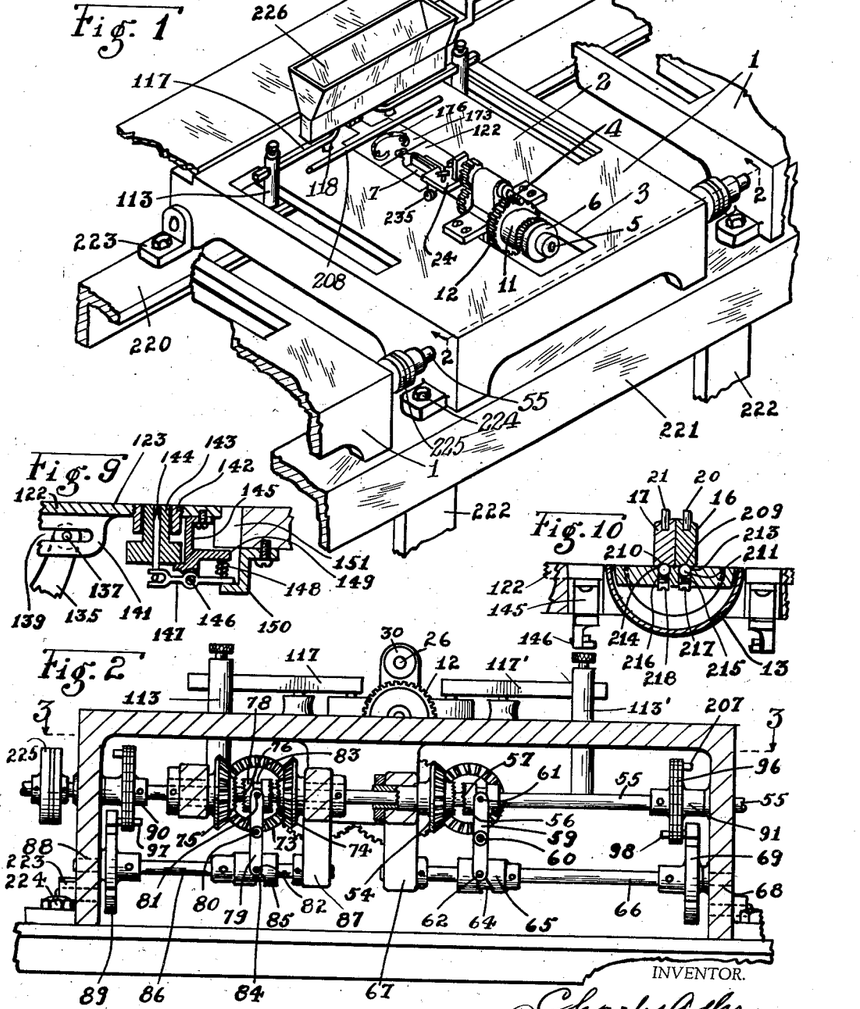
Fig. 1 is an isometric view of a complete unit, showing its relation to two adjacent units partly broken away.
Fig. 2 is an end section taken on the line 2—2 of Fig. 1, parts being shown in elevation.
Fig. 9 is a cross-section on the line 9—9 of Fig. 8.
Fig. 10 is a section on line 10—10 of Fig. 8.
Figure 3:
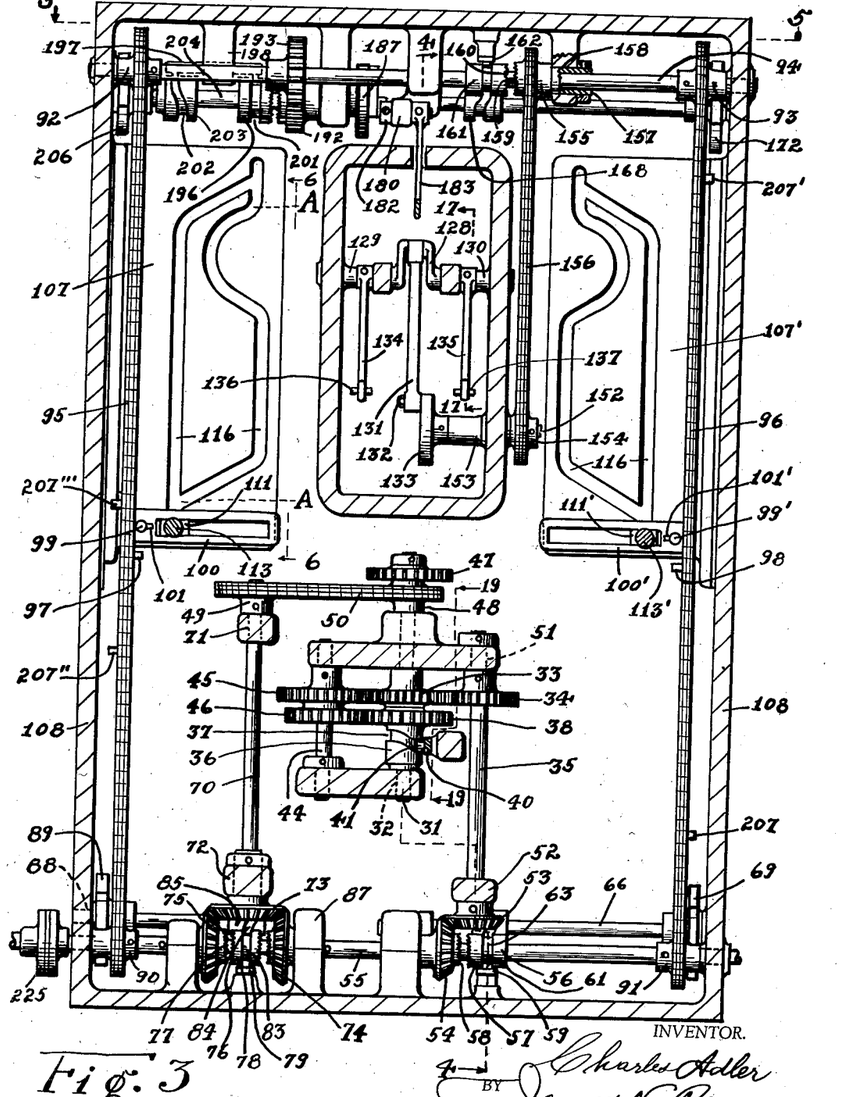
Fig. 3 is a sectional plan view taken on the line 3—3 of Fig. 2.
Figures 4, 6, 7, 15, 16:
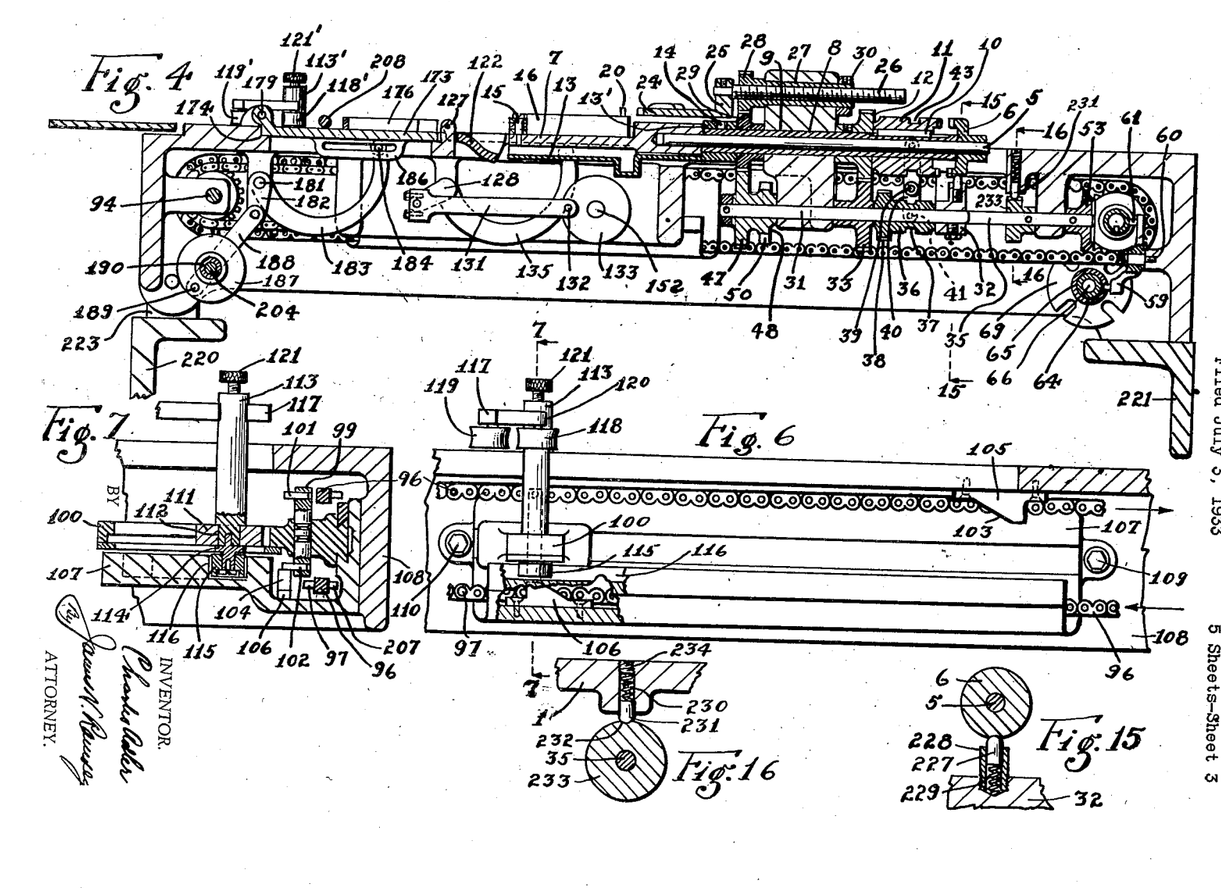
Fig. 4 is a cross-section taken on the line 4—4 of Fig. 3.
Fig. 6 is a section on the line 6—6 of Fig. 3.
Fig. 7 is a cross-section on line 7—7 of Fig. 6.
Fig. 15 is a sectional view taken on line 15—15 of Fig. 4.
Fig. 16 is a sectional view taken on line 16—16 of Fig. 4.
Figure 8:
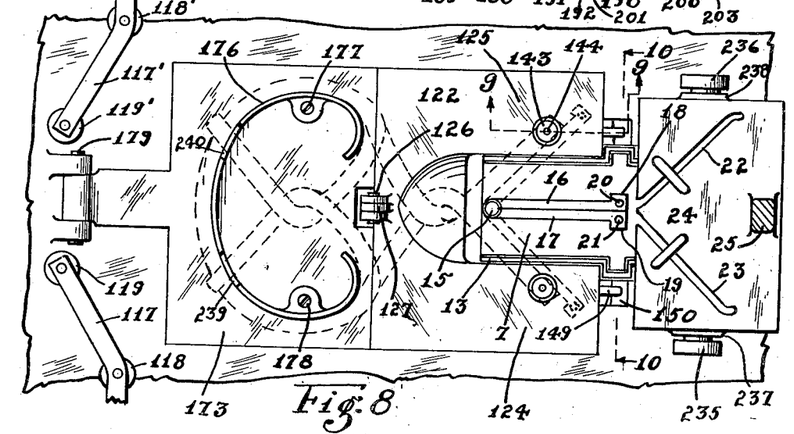
Fig. 8 is a plan view showing the form and twister.

In my invention a pretzel forming unit comprises a table 1 having a flat surface 2 with a cut-out portion 3 to receive an operative assembly 4 hereinafter referred to as the twister. This twister comprises a shaft 5 (Fig. 4) having pinned thereon at one end a clutch member 6 and at the other end a twister member 7 (Fig. 1). A sleeve 8 encases said shaft 5 and is supported by the bearing 9. Slidably mounted on said sleeve 8 by means of key 10 is a clutch member 11 (Figs. 1 and 4). Operating gear 12 is fixed upon sleeve 8 and is the means of giving motion thereto. A semi-cylindrical cover 13 having hub 13' is fixedly mounted upon the end of said sleeve 8 by means of set screw 14. A stud 15 mounted upon the forward end of twister member 7 forms the king pin or hinge for dividers 16 and 17 (Fig. 8). At the end opposite the hinge each divider 16 and 17 is provided with a shoulder 18 and 19 respectively having a pin 20 and 21 respectively inserted therein. Grooves 22 and 23 in a plate 24, hereinafter termed a spreader, are designed to engage the pins 20 and 21 respectively when said spreader 24 is moved forward horizontally over the dividers 16 and 17. Said spreader 24 has extending upwardly therefrom a tongue 25 in which is fastened a shaft 26 threaded in a sleeve 27. Shaft 26 is given a longitudinally reciprocal motion by means of the threaded sleeve 27 mounted in bearing 9, one end of said sleeve having formed thereon a gear portion 28 to engage intermediate gear 29 mounted loosely upon sleeve 8, as shown in Fig. 4. A collar 30 fastened upon the end of sleeve 27 opposite that of the gear-formed end is the means of positioning said sleeve. Directly beneath shaft 5 is an intermediate shaft 31 mounted in bearing 9 and bearing 32 and having loosely mounted thereon intermediate gear 33 driven by gear 34 (Fig. 3), said gear 34 being fastened on shaft 35. Rotatably mounted on shaft 31 is a cam member 36 having a cam groove 37 and gear-formed end 38. Pivoted in a stud 39 is an actuating lever 40 having pins 41 and 42 engaging in the grooves 37 of cam member 36 and grooves 43 of clutch member 11 respectively. A second intermediate shaft 44 (Fig. 3) mounted adjacent shaft 31 has mounted thereon reduction gears 45 and 46 engaging gears 33 and gear-form 38 of cam member 36 respectively. Also rotatably mounted upon shaft 31 is gear 47 engaging with intermediate gear 29 mounted on sleeve 8 (Fig. 4). Forming an integral part of said gear 47 is sprocket wheel 48 which is connected to sprocket wheel 49 by means of chain 50. Shaft 35 supported in bearings 51 and 52 has pinned thereon bevel gear 53 engaging bevel gear 54 loosely mounted on driving shaft 55. A clutch member 56 slidably mounted on shaft 55 has the clutch face 57 to engage with clutch face 58 on bevel gear 54. A lever 59 (Figs. 2 and 3) pivoted on stud 60 having pins 61 and 62 to engage in grooves 63 in clutch member 56 and grooves 64 in cam member 65 respectively, said member 65 being fixed on shaft 66, said shaft being supported in bearings 67 and 68 (Fig. 2). Fixedly mounted on shaft 66 is a star wheel 69. Sprocket wheel 49 (Fig. 3) is fixedly mounted on one end of shaft 70 supported in bearings 71 and 72, said shaft having a bevel gear 73 fixedly mounted on its other end. Meshing with bevel gear 73 and rotatably mounted on shaft 55 are bevel gears 74 and 75 having clutch faces 76 and 77 respectively (Fig. 3). Slidably mounted on shaft 55 is clutch member 78 interposed between bevel gears 74 and 75. A clutch lever 79 (Fig. 2) pivotally mounted on stud 80 has pins 81 and 82 adapted to engage groove 83 in clutch member 78 and groove 84 in cam member 85 respectively, said member 85 being fixedly mounted on shaft 86, said shaft 86 being mounted in bearings 87 and 88 (Figs. 2 and 3).

Fixedly mounted on shaft 86 is a star wheel 89 (Fig. 2). Fixedly mounted on drive shaft 55 are sprocket wheels 90 and 91 connected to sprocket wheels 92 and 93 respectively by means of chain belts 95 and 96 respectively, said sprocket wheels 92 and 93 being fixedly mounted on secondary drive shaft 94. Pins 97 and 98 (Figs. 2, 3, 6 and 7) mounted on chains 95 and 96 respectively engage vertical pins 99 and 99' (for the sake of simplicity and so as to avoid confusion in the mind of the reader, the parts about to be described are in duplicate and will therefore be described as one, the prime on the drawings denoting its counterpart) vertically and reciprocally mounted in brackets 100 and 100'. Stud 101 projects laterally from pin 99 to engage the inclined surfaces 103 and 104 of stop members 105 and 106 respectively. The slotted bracket 100 (Figs. 6 and 7) is suitably and slidably mounted in a guide member 107 fastened to the inner side of a downwardly extending wall 108 of the table 1 by means of bolts 109 and 110. Mounted slidably in the bracket 100 is a block 111 having a square hole 112, said hole having positioned therein a standard 113. Threaded into the lower end of standard 113 is a stud shaft 114 carrying a roller 115. A groove 116 adapted to receive roller 115 is formed in the guide 107. An arm 117 (Figs. 4, 5, 6 and 8) having positioned thereon rollers 118 and 119 is inserted in an opening 120 in standards 113. A set screw 121 may be employed to hold the arm in the desired position.

Figures 18, 19, 20:
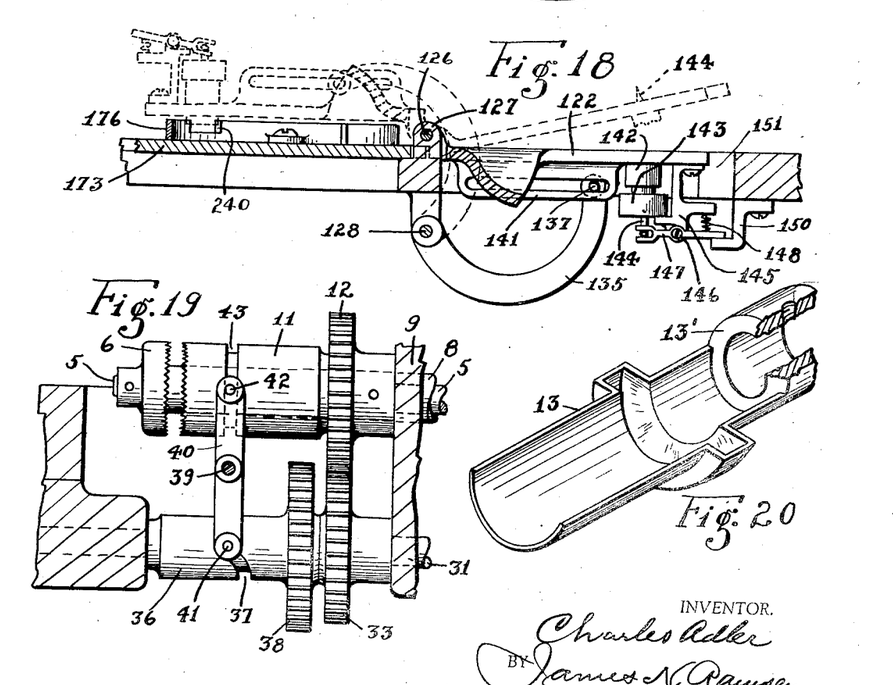
Fig. 18 is a vertical section through the table showing the flipper member in full lines and also by dotted lines when in inverted position to place the ends of the noodle upon the circular portion thereof.
Fig. 19 is a view partly in section and partly in side elevation of the twister actuating mechanism.
Fig. 20 is an isometric view partly in section of the semi-cylindrical cover.

The flipper (Figs. 8 and 18) comprises a member 122 having its upper surface 123 flush with the surface 2 of table 1 and having two portions 124 and 125 lying adjacent the twister 7 and semi-cylindrical cover 13. The flipper is hinged upon a pin 126 supported in a bracket 127 extending upwardly from table 1 (Figs. 4, 8 and 18). The axis about which the flipper is actuated is in a vertical and perpendicular plane above the rearward edge of the form plate 173. The distance between the rear and open ends of the form 176 and the rearward edge of the form plate 173 is approximately one-half the thickness of a noodle so that when the flipper is actuated about its axis the noodle will take the position as shown in dotted lines in Fig. 8, with the twisted portion reposing on the inside of the form 176 and the spread ends lying directly over the circular portion of the noodle. Located directly beneath hinge pin 126 (Figs. 4 and 18) is crank shaft 128 supported in bearings 129 and 130 (Fig. 3) with a connecting rod 131 connecting said crank shaft 128 and pin 132 on actuating wheel 133. Fixedly mounted on crank shaft 128 are two curved arms 134 and 135 (Figs. 3, 4, 9 and 18) having pins 136 and 137 respectively mounted in their other end, said pins engaging slots 138 and 139 respectively in brackets 140 and 141 respectively upon the underneath side of flipper 122 when in its normal position; i. e., having its upper surface 123 flush with the upper surface 2 of table 1. Threaded into flipper 122 (Fig. 9) is a collar 142 in which is slidably mounted a weight 143. A pin 144 is slidably mounted in the weight 143. A bracket 145 is secured to the underneath portion of the flipper 122 and has a pin-bearing 146 for rocker shaft 147, said rocker shaft 147 being forked at one end and adapted to engage the pin 144 as per Figs. 9 and 18. The other end of rocker arm 147 has a force exerted upon it by spring 148 mounted between said end of rocker arm and protruding portion 149 of bracket 145. A bracket 150 is secured to the under portion of table 1 and forms a seat for rocker arm 147. The table 1 is slotted at 151 (Figs. 8 and 9) to accommodate the passage therethrough of bracket 145 and rocker arm 147 when flipper is being actuated around its axis or hinge pin 126. Actuating wheel 133 (Fig. 3) is fixedly mounted on one end of shaft 152 mounted in bearing 153 and having fixedly mounted upon the other end sprocket wheel 154, said sprocket wheel being connected to sprocket wheel 155 (Fig. 5) on secondary drive shaft 94 by means of chain belt 156. Forming an integral part of sprocket wheel 155 is sleeve 157 (Fig. 3) in bearing 158, said sleeve being loosely mounted on secondary drive shaft 94. Sprocket wheel 155 has clutch face 159 adapted to be engaged by clutch face 160 of clutch member 161, said clutch member 161 being slidably mounted on secondary drive shaft 94. A lever 162 pivoted on stud 163 has pins 164 and 165 adapted to engage groove 166 of clutch member 161 and groove 167 in cam member 168, said cam member 168 being fixedly mounted on shaft 169 supported in bearings 170 and 171. Said shaft 169 has also fixedly mounted upon it star wheel 172.

Figure 17:
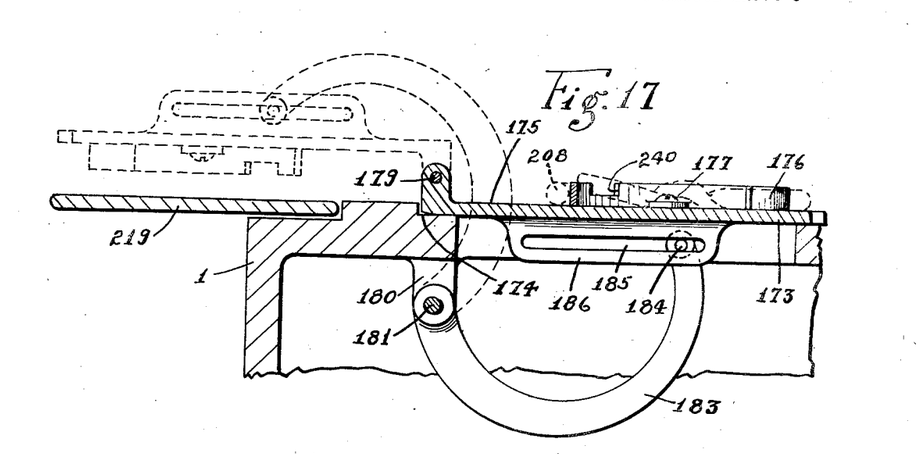
Fig. 17 is a vertical section through the table showing the pretzel form and operating mechanism in full lines and showing the same also by dotted lines in position for discharging or ejecting the pretzel.

The form for the pretzel comprises a form plate 173 (Fig. 8) resting in shoulder or recess 174 (Fig. 4) of table 1 and also having its upper surface 175 flush with surface 2 of table 1. A pretzel form 176 (Figs. 4 and 8) is mounted on surface 175 of member 173 by means of set screws 177 and 178. The form 176 has the contour and general outline of a pretzel as shown in Fig. 8. Form plate 173 is hingedly mounted on table 1 by means of hinge 179. Directly beneath hinge 179 (Fig. 4) and mounted in bearing 180 of table 1 is a shaft 181 having fixedly mounted thereto crank arm 182 and curved arm 183 (Figs. 3, 4 and 17). A pin 184 mounted in the other end of curved arm 183 is adapted to engage a slot 185 in bracket 186 mounted on form plate 175. Crank arm 182 is connected to actuating crank wheel 187 by connecting rod 188 mounted on pins 189 in crank arm 182 and pin 189 in crank wheel 187.

Said crank wheel is fixedly mounted on sleeve 190 (Figs. 4 and 5) supported by bearing 191. Loosely mounted on sleeve 190 is gear 192 driven by gear 193 fixedly mounted on secondary drive shaft 94. Gear 192 has a clutch face 194 adapted to be engaged by clutch face 195 of clutch member 196, said clutch member being slidably keyed on sleeve 190. A lever 197 slidably mounted on bracket 198 of table 2 has pins 199 and 200 adapted to engage circular groove 201 in clutch member 196 and cam groove 202 in cam member 203 respectively, said cam member 203 being fixedly mounted on shaft 204. Said shaft 204 is supported in bearings 205 and sleeve 190. Said shaft 204 has also mounted upon it star wheel 206.

The star wheels 69, 89, 172 and 206 are adapted to be engaged by a number of pins 207, 207', 207" and 207''' mounted on chains 95 and 96 respectively.

Suitable means such as hopper 226 is provided for the purpose of feeding the noodles into the proper position for the first step of the operation.

The following designates the preferred procedure followed in operation and is not intended to limit said operation to the exact means as shown or described herein. The means necessary to accomplish these results may be of a varied mechanical nature.

Figure 11:
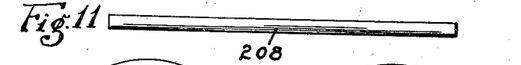
Fig. 11 shows a strip of dough in the form in which it is placed upon the machine and hereinafter referred to as "noodle"
Figure 12:
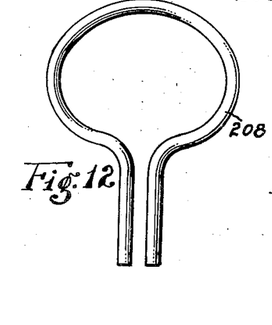
Fig. 12 shows a step in the process.

*First step.*—In the drawings as shown, motion is given to the drive shaft 55 through any mechanical means synchronous with the feeding device for placing the noodles upon the table. Sprocket wheels 90 and 91 fixedly mounted on shaft 55 impart a continuous motion to chains 95 and 96, thence through sprocket wheels 92 and 93 respectively to secondary drive shaft 94, the direction of the motion of the chains being that as indicated by the arrows in Fig. 6. After the noodle 208, as shown in Figs. 1 and 11, has been deposited on the table directly ahead of the form as shown in Fig. 1, pins 97 and 98 on chains 95 and 96 respectively engage vertical pins 99 and 99' thereby carrying the brackets 100 and 100' rearwardly or in the direction away from the secondary drive shaft 94 and toward the drive shaft 55 which we will hereinafter designate as the rear end of the machine. The rollers 115 on the rearward travel of the brackets 100 and 100' will ride in that portion of the groove AA, as shown in Fig. 3. The contour of this portion of the groove conforms to that of the curved portion of the form 176 and straight sides of the dividers 16 and 17, adjacent which the ends of the noodle are deposited, so that in this rearward motion the rollers 118 and 119 and 118' and 119' are moved transversely of the table thereby effecting the shape of the noodle around the form and along the dividers and forming the first step in the process, as illustrated in Fig. 12. Vertical pins 99 and 99' are deflected downwardly by means of the horizontal pins 101 and 101' contacting the inclined surfaces 103 and 103' of stop members 105 and 105' thereby allowing pins 97 and 98 on chains 95 and 96 to ride over vertical pins 99 and 99'. The rollers 115 and 115' are now positioned in the straight-away return portion of the groove 116 so that when pins 97 and 98 are being brought back to their original starting point they will contact the lower portion of vertical pins 99 and 99', returning brackets 100 and 100' to their original position being stopped in this position by the same means that were employed to stop on the rearward travel; i. e., pins 102 and 102' contacting the inclined surfaces 104 and 104' of stop members 106 and 106' will lift the vertical pins 99 and 99' thereby allowing pins 97 and 98 to go forward unimpeded.

*Second step.*—The star wheel 69 (Fig. 2) on shaft 66 is now actuated by one of the pins 207 on chain 96 thereby rotating cam member 65, the cam groove in said member 65 being so formed as to swing lever 59 around its pivot 60 thereby engaging clutch member 56 with clutch face 58 on bevel gear 54 and imparting motion thereto. Motion is then imparted through bevel gears 54 and 53, shaft 35, gear 34 to gear 33 mounted loosely on shaft 31 (Fig. 4), and thence to gear 12 secured to sleeve 8. Motion is at the same time imparted as before through bevel gears 54 and 53, shaft 35, gears 34 and 33 to reduction gears 45 and 46, and thence to gear 38, said gear 38 having formed as an integral part thereof the cam member 36 with its cam groove 37. The reduction gears are employed so as to reduce the speed of cam member 36 to one-half that of clutch member 11 which is slidably mounted on sleeve 8. The cam groove in cam member 36 is so formed that after sleeve 8 has made one-half of one revolution the lever 40 will be swung about its pivot 39 thereby engaging the clutch members 11 and 6 at which time the sleeve 8 and its appurtenances will be rotating as one with the shaft and its appurtenances. In this way, after the ends of the noodle have been deposited upon the twister and adjacent the dividers, as described in the first step, the semi-cylindrical portion 13 of the cover will encase the ends of the noodle on the first half-turn of the sleeve 8. The contacting of the clutch members 11 and 6 will then cause the complete twister to rotate with the form now encasing the ends of the noodle. When a complete revolution has been made with the form encasing the noodle, the cam groove 37 will act so as to disengage clutch members 11 and 6 allowing the semi-cylindrical form 13 to continue on for another half revolution resuming its normal position directly underneath. The sleeve 8 with its appurtenances in this way makes two complete revolutions whereas the twister member 7 makes one complete revolution. At this point another pin 207' suitably positioned in properly spaced relation from the pin 207 on chain 96 actuates the star wheel 69, shaft 66 and cam member 65, which in turn actuates lever 59, disengaging clutch member 56 and clutch face 58 of bevel gear 54. The noodle is now in the position shown in Fig. 13.

Figure 5:
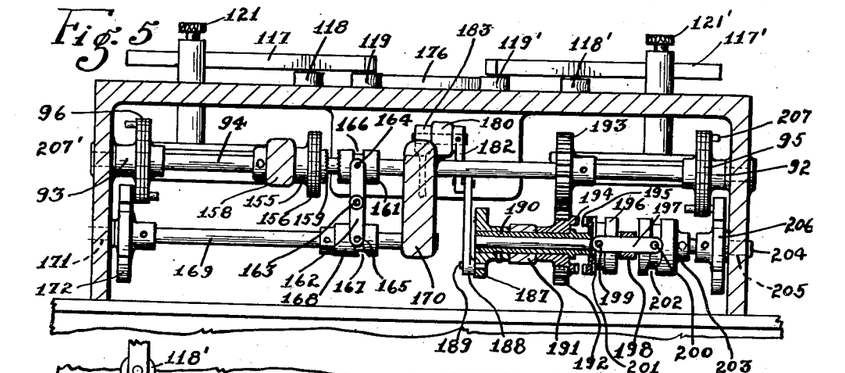
Fig. 5 is an end section taken on the line 5—5 of Fig. 3.

*Third Step.*—At this point a pin 207'' (Fig. 3) on chain 95 engages star wheel 89, said star wheel being fixedly mounted upon shaft 86. Cam member 85 also fixedly attached to shaft 86 is thereby rotated. Cam grove 84 actuates lever 79 about its pivotal point 80 thereby causing clutch member 78 to engage clutch face 76 on bevel gear 74. Clutch member 78 being slidably connected to drive shaft 55 imparts motion to bevel gear 74, thence through bevel gear 73, shaft 70, sprocket wheel 49, chain 50, sprocket wheel 48 and its integral gear 47 through intermediate gear 29 mounted loosely on sleeve 8 to gear-formed end of threaded sleeve 27. Rotating in this direction, said sleeve 27 will impel spreader blade 24 forwardly. Slots 22 and 23 in spreader blade 24 (Fig. 8) will engage pins 20 and 21 on dividers 16 and 17 respectively causing them to spread and assume the position as shown by dotted lines in Fig. 8. At this point another pin 207''' positioned on chain 95 again actuates star wheel 89 and in turn cam member 85. Cam groove 84 on said cam member 85 is so formed that it will at this time actuate lever 79 so that the clutch member 78 and clutch face 77 of bevel gear 75 are now engaging. The train of motion will be the same as before except that bevel gear 75 will cause bevel gear 73 and its train to rotate in an opposite direction thereby causing the spreader plate 24 to move rearwardly to its original position also bringing the dividers 16 and 17 to their original position. The spreader plate may be held in a horizontal and parallel plane with the upper surface 2 of table 1 by means of rollers 235 and 236 mounted in brackets 237 and 238 respectively, said brackets extending downwardly from said spreader plate 24 so that the rollers 235 and 236 may ride along the surface 2 of table 1. The dividers 16 and 17 are held in their locked position by means of recesses 209 and 210 (Fig. 10) formed in the lower surface of the dividers 16 and 17 respectively, said recesses being adapted to receive balls 211 and 212 held against apertures 213 and 214 in the twister member 7 by means of springs 215 and 216 and set screws 217 and 218 respectively. The noodle is then ready for what is termed the "flip" which is caused by a pin 207 engaging star wheel 172, shaft 169 and its fixedly mounted cam member 168. The cam groove 167 (Fig. 5) acting upon pin 165 of lever 162 swings said lever 162 about its pivot 163 and pin 164 riding in circular groove 166 of clutch member 161, causing said clutch member 161 to engage with clutch face 159 of sprocket wheel 155 mounted loosely on secondary drive shaft 94. The clutch member 161 (Fig. 3) slidably and fixedly mounted on secondary drive shaft 94 thereby imparts motion to sprocket wheel 155 through chain 156 to sprocket wheel 154 thence through shaft 152 to crank wheel 133, thence through connecting rod 131 to crank shaft 128 upon which are fixedly mounted curved arms 134 and 135. Flipper 122 will then be actuated one-half of a revolution about its hinge 126 (Fig. 8). When the flipper is in its normal position the bracket 150 secured to the underside of the table causes the forked lever 147 to act upon pointed pin 144 so as to have its point beneath the surface of the flipper or table. As soon as the flipper is actuated the spring 148 interposed between the portion 149 of bracket 145 and end of forked lever 147 causes said lever to move about its pivot 146 thereby causing the pointed pin to pierce the ends of the dough as shown in Figs. 9 and 18. When the flipper 122 is in its inverted position the weight 143 bears down on the noodle at the juncture of the end portions with the circular portion thereof thereby pressing them together and allowing the pointed pin to be readily withdrawn. To position twister member 7 so that its upper surface may be flush with surface 2 of table 1 prior to the first step, any means such as illustrated in Fig. 15, may be used. A recess in clutch member 6 is adapted to receive a pin 227 slidably mounted in a sleeve 228 threaded into table 2. A spring 229 may be employed to exert pressure upon pin 227. Similar means may be employed as illustrated in Fig. 16 to position and cause the edges of the semi-cylindrical form 13 to be flush with the surface 2 of table 1. A spring 230 exerting pressure on a pin 231 is adapted to engage a notch 232 in a flanged wheel 233 fixedly mounted on shaft 35. A set screw 234 may be used for adjusting the tension on spring 230. The ends of the noodle are now deposited on the form plate 173 as shown in Fig. 14 and also by dotted lines of Fig. 8. The form 176 has cut-out portions to allow the ends of the noodle to be brought into actual contact with the circular portion thereof. Pin 207' on chain 96 contacts and engages star wheel 172 thereby through cam member 168 and lever 162 disengaging clutch member 161 and sprocket wheel 155 (Fig. 5). At this point a pin 207" on chain 95 engages a star wheel 206 fixedly mounted on shaft 204. The fixedly mounted cam member 203 with its actuating groove 202 is rotated thereby causing the lever 197 to shift the clutch member 196 into engagement with the clutch face 194 of gear 192. Clutch member 196 being slidably keyed to sleeve 190 imparts motion thereto when contacting the clutch face of gear 192. Motion is then imparted to the crank wheel 187 through connecting rod 108 to crank arm 182 thence to shaft 181 on which is fixedly mounted the curved arm 183. Curved arm 183, actuated about its axis 181 and with its pin 184 engaging the slot 185 in bracket 186 of the form plate 175, causes said form plate to rotate about its hinge 179 (Figs. 4 and 17). A belt or other means may be employed as designated by Fig. 219 upon which the form plate deposits the finished product.

A suitable frame such as is commonly used in bakery machinery, designated by numerals 220 and 221, is supported by vertical members 222. In the preferred embodiment of my invention table 1 is pivotally mounted in brackets 223 on frame 220 and secured to frame 221 by means of bolts 224. As illustrated in Fig. 1, any number of units may be placed adjacent one another, the drive shaft 55 of each individual unit being coupled with its neighbor by means of coupling 225. The positioning of pins 97, 98, 207, 207', 207" and 207''' on chains 95 and 96 respectively will determine the period or cycle of operation so that were a number of these units so placed their starting would be sequential with their preceding unit.

It will be understood that my invention is capable of considerable modification without departure from its scope or spirit as defined by the claims.

What I claim as new and desire to secure by Letters Patent is:

1. In a device for making pretzels, a table, a rigid pretzel form mounted thereon, means for shaping a noodle around the form and bringing free end portions of said noodle into parallel relation, means for making a twist in the noodle, means for spreading end portions of said noodle, folding means adapted to bring the end portions of said noodle into contact with the central portion thereof and means for ejecting the pretzel from the form.

2. In a device for making pretzels, a table, a rigid pretzel form pivotally mounted thereon, means for shaping a noodle around the form and bringing free end portions of said noodle into parallel relation, means for making a twist in the noodle, means for spreading end portions of said noodle, a flipper pivotally mounted on the table for folding the end portions of said noodle into contact with the circular portion thereof and means for ejecting the pretzel from the form.

3. In a device for making pretzels, a table, a rigid pretzel form mounted thereon, means for shaping a noodle around the form and bringing free end portions of said noodle into parallel relation, means for making a twist in the noodle between its ends, means pivotally mounted on said twisting member adapted to bring the end portions of the noodle at a spaced apart angle to each other, a flipper adapted to turn the spaced end portions of said noodle into contact with the circular portion thereof and means for ejecting the pretzel from the form.

4. In a device for making pretzels, a table, a rigid pretzel form thereon, means for depositing a noodle adjacent said form, means adapted to shape the noodle around the form, means for making a twist in the noodle, means for spreading the end portions of said noodle, means adapted to bring the end portions of said noodle into contact with the central portion thereof and means for ejecting the pretzel from the form.

5. In a device for making pretzels, a table, a substantially oval pretzel form thereon, means for depositing a noodle adjacent said form, arms adapted to shape the noodle around the form, means for making a twist in the noodle, means for spreading the end portions of said noodle, a flipper adapted to bring the end portions of said noodle into contact with the circular portion thereof and means for ejecting the pretzel from the form.

6. In a device for making pretzels, a table, a pretzel form thereon, means for shaping the noodle around the form, leaving the end portions spaced from each other, means for twisting said noodle between its ends, a slidable plate having grooves therein, a pair of dividers pivotally mounted on the twister and adapted to lie between the ends of said noodle, and having pins adapted to traverse said grooves whereby said dividers are moved upon their pivots respectively to spread said ends into angular relation to each other, means to bring the end portions of said noodle into contact with the central portion thereof and means to eject the pretzel from the form.

7. In a device for making pretzels, a table, a circular pretzel form thereon, means for shaping the noodle around the form, leaving the end portions parallel to each other, means for twisting said noodle between its ends, a slidable plate having grooves therein, a pair of dividers pivotally mounted on the twister and adapted to lie between parallel ends of said noodle, and having pins adapted to traverse said grooves whereby said dividers are moved upon their pivots respectively to spread said ends into angular relation to each other, means to bring the end portions of said noodle into contact with the circular portion thereof and means to eject the pretzel from the form.

8. In a device for making pretzels, a table, a pretzel form thereon, means for depositing a noodle adjacent said form, means adapted to shape a noodle around the form leaving its end portions parallel and spaced apart from each other, a twister comprising means to support said end portions of the noodle, means interposed between said end portions to maintain them in said spaced apart relation, a cover adapted to encase said end portions and hold them in contact with said support and interposed means, and means for giving said twister one revolution and said cover two revolutions whereby said end portions are twisted and said cover removed from its encasing position of the noodle, and means for bringing said end portions into contact with the circular portion of the noodle to form a pretzel.

9. In a device for making pretzels, a table, a pretzel form mounted thereon, means for shaping a noodle around the form, means for making a twist in the noodle, means for spreading the end portions of said noodle, a pivotally mounted flipper adapted to bring the end portions of said noodle into contact with the circular portion thereof and having a weight and a spring actuated pin adapted to project through said weight and pierce the end of the noodle to hold it in proper angular position while being moved into contact with the circular portion, said weight being adapted to press the end portions of the noodle into compressed relation with the circular portion, said weight pressing downwardly to release said pin from the noodle and allowing free return movement of said flipper.

10. In a device for making pretzels, a pretzel form, means for shaping a noodle around the form, means for making a twist in the noodle, means for spreading the end portions of said noodle after it is twisted, a pivotally mounted flipper adapted to bring the end portions of said noodle into contact with the circular portion thereof, and having a weight slidably mounted therein to compress the end portion into contact with the circular portion, said weight having a hole therethrough with a pointed pin mounted in said hole and having spring actuated means adapted to force the point of said pin into the noodle whereby it is held in proper position while the flipper brings the noodle into contact with the circular portion.

11. In a device for making pretzels, a pretzel form, means for shaping a noodle around the form, means for making a twist in the noodle, means for positioning said twisting means in their normal or receiving position, means for spreading the end portions of said noodle after it is twisted, means for positioning said spreading means before the ends are twisted, a pivotally mounted flipper having a slidable weight mounted thereon and a pin mounted in a hole through said weight adapted to hold the ends of the noodle in the proper position while the flipper brings the ends of said noodle into contact with the circular portion thereof.

12. In a device for making pretzels, a table, a pretzel form pivotally mounted thereon, means for actuating said pretzel form, comprising a slotted bracket, a shaft, an arm fixedly mounted on said shaft and having a pin adapted to ride in said slotted bracket so that when the arm is rotated about its pivotal point the form is likewise actuated about its pivotal point, a twister, means for actuating said twister, a pivotally mounted flipper and means for actuating said flipper about its axis.

13. In a device for making pretzels, a table, a pretzel form pivotally mounted thereon, means for actuating said pretzel form, a twister, means for actuating said twister, a pivotally mounted flipper comprising a slotted bracket, a shaft, means for actuating said flipper about its axis and an arm mounted on said shaft and in said slotted bracket so that when the arm is rotated about its pivotal point the flipper is likewise actuated about its pivotal point.

14. In a device for making pretzels, a table, a pretzel form mounted thereon, a pair of brackets mounted on said table, each of said brackets having a groove therein, a second pair of brackets slidably mounted in the first mentioned brackets respectively and each having a standard slidably mounted therein, a roller on each standard engaging said grooves respectively, a pair of arms mounted in said standards respectively, and means mounted on said arms adapted to engage the noodle and press it into the desired shape around the form.

15. In a device for making pretzels, a table, a pretzel form mounted thereon, a pair of brackets mounted upon said table, each of said brackets having an elongated groove with portions spaced apart and parallel and having oblique portions connecting said parallel portions and also having an inwardly curved portion forming a section of one parallel portion, and also having a projecting end portion at each extreme end, a second pair of brackets slidably mounted in the first-mentioned brackets respectively, each having a standard slidably mounted therein, a roller on each standard engaging said grooves respectively, a pair of arms mounted in said standards respectively, and means mounted on said arms adapted to engage the noodle and press it into the desired shape around the form.

16. In a device for making pretzels, a table, a pretzel form mounted thereon, means for shaping a noodle around the form, means for making a twist in the noodle comprising a member having dividers and being fixedly mounted on a shaft, a sleeve rotatably mounted on said shaft, a cover mounted on said sleeve, a clutch slidably mounted on said sleeve and adapted to engage and disengage with a secondary clutch fixedly mounted on said shaft, means for actuating said clutch whereby motion is imparted to the sleeve, the shaft remaining immovable for a certain period, thereby giving said twister one revolution and said cover two revolutions whereby the end portions of the noodle are twisted and said cover is made to assume its position beneath the surface of the table.

17. In a device for making pretzels, a table, a pretzel form mounted thereon, means for shaping a noodle around the form, means for making a twist in the noodle including a member fixedly mounted on a shaft and having dividers hingedly mounted thereon, a sleeve rotatably mounted on said shaft, a cover fixedly mounted on said sleeve, means for moving said cover in a position over said noodle, means for engaging the twister therewith whereby the cover and twister are simultaneously given one complete revolution while the twist is being formed, and means for moving said cover to its position beneath the surface of the table whereby the noodle is uncovered.

18. In a device for making pretzels as specified in claim 1, said folding means having spring actuated pins to pierce and hold the ends of the noodle while they are being carried by said folding means to their final position on the circular portion of the pretzel.

19. In a device for making pretzels, a table, a pretzel form mounted thereon, means for shaping a noodle around the form and into engagement with a twisting means, means for making a twist in the noodle, means for spreading the end portions of the noodle at an angle to each other, a substantially U-shaped flipper plate pivotally mounted and having its free end portions disposed on opposite sides of the twisting means and movable independently of said means, to fold the twisted and angular portions of said noodle into contact with the circular portion.

20. In a device for making pretzels, a grooved spreader plate, a pair of dividers pivotally mounted at one end adjacent the spreader plate, said dividers having pins projecting from their free ends adapted to traverse the grooves in the spreader plate to effect the operation of the dividers, and a semi-cylindrical casing rotatably mounted relative to the dividers and adapted to freely encase the loose ends of a noodle and the dividers and said casing having an enlarged transverse recess to permit said casing to ride over the pins projecting from the free ends of the dividers.

21. In a pretzel forming machine of the class described the combination of a form for the body portion of the pretzel, means for folding a pretzel noodle around said form with the ends thereof projecting therefrom and freely disposed, means for twisting the ends of the noodle at a point adjacent the body portion whereby the free ends of the noodle are drawn toward the body portion of the pretzel to maintain the cross-sectional area of the noodle uniform throughout its length, means for subsequently folding the spaced ends of the noodle onto the body portion thereof, and means including a cover mounted on said twister for holding the free ends of the noodle against inadvertent displacement during the twisting thereof.

22. In a pretzel forming machine of the class described the combination of a form for the body portion of the pretzel, means for folding a pretzel noodle around said form with the ends thereof projecting therefrom and freely disposed, means for twisting the ends of the noodle at a point adjacent the body portion whereby the free ends of the noodle are drawn toward the body portion of the pretzel to maintain the cross-sectional area of the noodle uniform throughout its length, means for subsequently folding the spaced ends of the noodle onto the body portion thereof, means for holding the free ends of the noodle against inadvertent displacement during the twisting thereof, and additional means for further holding the free ends of the noodle during the folding thereof onto the body portion and releasing said ends upon engagement thereof with the said body portion.

23. In a pretzel forming machine of the class described the combination with a pretzel form about which a noodle is to be folded, and means for folding the noodle around the form without changing the cross-sectional area of the noodle at any point and with the ends of the noodle disposed in a free, spaced relation, of means including a semi-cylindrical casing for loosely engaging and twisting the ends of the noodle at a point adjacent the body form and whereby slack necessary to form the knot is obtained by drawing the ends of the noodle toward the body portion, means for further spacing the ends of the noodle below the knot without effecting a stretch in the noodle, and means for folding the ends of the noodle onto the body portion and engaging said ends with said body portion.

24. In a pretzel forming machine of the class described the combination with a pretzel form about which a noodle is to be folded, and means for folding the noodle around the form without changing the cross-sectional area of the noodle at any point and with the ends of the noodle disposed in a free, spaced relation, of means for twisting the ends of the noodle at a point adjacent the body form and whereby slack necessary to form the knot is obtained by drawing the ends of the noodle toward the body portion, means for further spacing the ends of the noodle below the knot without effecting a stretch in the noodle, a flipper plate for folding the ends of the noodle onto the body portion, pins for engaging said ends of the noodle to hold same during the folding thereof, additional means for compressing said ends of the noodle into the body portion, means for preventing inadvertent displacement of the free noodle ends during the twisting thereof, and additional means for holding the ends of the noodle in spaced relation during the folding thereof onto the body portion of the pretzel.

25. In a device for making pretzels, a table, a pretzel form mounted thereon for forming the body portion of the noodle, arms pivotally mounted adjacent the table and movable on the table surface for frictionally engaging the noodle and pushing same relative to this table surface for shaping the noodle around the form with the ends of the noodle freely disposed, means for making a twist in the noodle whereby the free end portions are drawn toward the form to prevent stretching in the noodle, means for spreading the end portions of the noodle, means for effecting a fold in the shaped and twisted noodle to bring the end portions and body portions into contact with one another, and cooperating means carried by the folding means and table for compressing said body portions and end portions into engagement with one another.

26. In a device for making pretzels, a table, a pretzel form mounted thereon for forming the body portion of the noodle, arms pivotally mounted adjacent the table and movable on the table surface for frictionally engaging the noodle and pushing same relative to the table surface for folding the noodle around the form without stretching the noodle and with the ends thereof freely disposed, means for making a twist in the noodle, means for spreading the end portions of the noodle whereby the said free end portions are drawn toward the body portion to prevent stretching in the noodle, a flipper, pins carried by the flipper and operable after the end portions have been spread for piercing same to hold the said end portions of the noodle during the operation of the flipper, means for holding the noodle in position while being pierced, means for compressing the noodle ends into the body portion and for disengaging the pins, and means for operating the flipper to bring the end portions into engagement with the body portion of the noodle and operable after the noodle-holding means has been released.

27. In a device for making pretzels, a table, a pretzel form for the body portion of the pretzel, a pair of dividers for separating the ends of the noodle, pusher means for shaping the noodle around the form and the dividers, means for twisting the said end portions of the noodle at a point adjacent the form and body portion, and a semi-cylindrical housing operable from an inoperative to an operative position to freely encase the end portions of the noodle and the dividers to retain the ends of the noodle against the dividers while the same are being twisted.

CHARLES ADLER.